May 24, 1927.

W. A. VAN BERKEL

SLICING MACHINE

Filed Nov. 11, 1926

Inventor
Wilhelmus A. van Berkel
By Nissen & Crane
attys.

May 24, 1927.

W. A. VAN BERKEL

SLICING MACHINE

Filed Nov. 11, 1926

Inventor
Wilhelmus A. van Berkel
By Nissen & Crane
attys.

Patented May 24, 1927.

1,630,099

UNITED STATES PATENT OFFICE.

WILHELMUS ADRIANUS van BERKEL, OF ROTTERDAM, NETHERLANDS, ASSIGNOR TO U. S. SLICING MACHINE COMPANY, OF LA PORTE, INDIANA, A CORPORATION OF INDIANA.

SLICING MACHINE.

Application filed November 11, 1926, Serial No. 147,665, and in Germany October 10, 1925.

This invention relates to machines for slicing meat and other commodities, and has for its object the provision of improved adjustable mechanism for receiving slices.

The invention is exemplified in the combination and arrangement of parts shown in the accompanying drawings and described in the following specification, and it is more particularly pointed out in the appended claims.

In the drawings—

Figure 1:
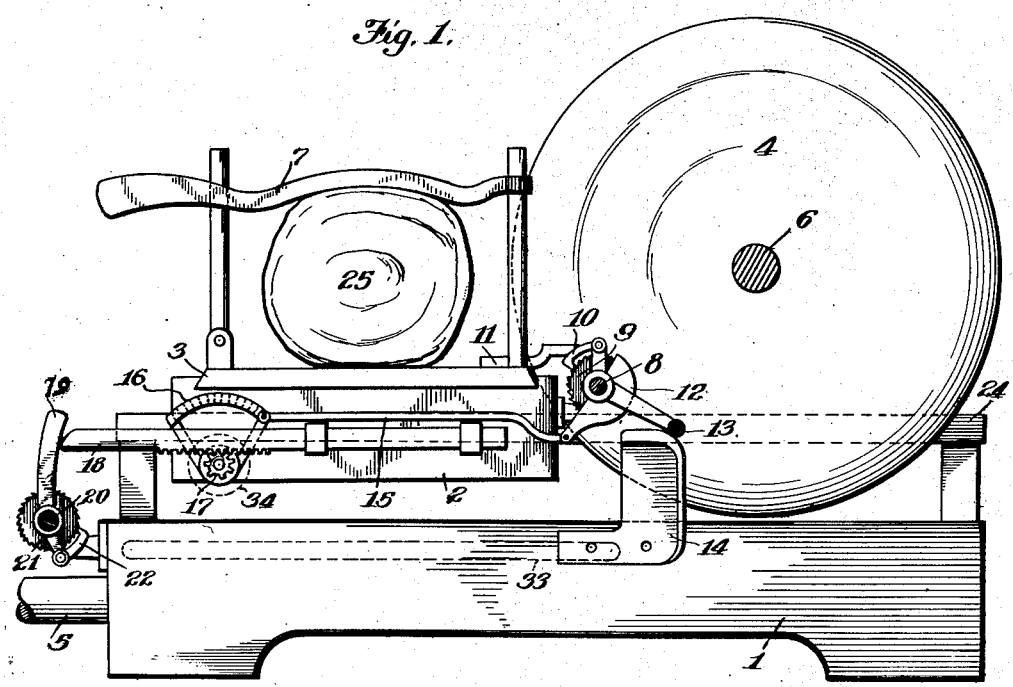
Fig. 1 is a rear elevation of a slicing machine having one embodiment of the present invention applied thereto.

In the embodiments illustrated the invention is shown as applied to a slicing machine having a rotary slicing knife, a reciprocating table and a transversely sliding meat support carried by the table, similar to that illustrated in Patent No. 1,290,425, granted January 7, 1919, to C. F. M. van Berkel. In machines of the nature shown in that patent a vertically movable slice receiver is provided and mechanism is provided for transporting the slices and depositing them broad side down to form a stack on the receiver.

The present invention contemplates mechanism for feeding the receiver downwardly so that the top of the stack will be at substantially the same level through the slicing operation. The feeding means is adjustable to vary the rate of downward movement in accordance with the thickness of the slices and the adjusting means for regulating the thickness of the slices also regulates the rate at which the slice receiving table is fed downwardly. The slice receiver, however, may be set at any desired height independently of the position of the piece from which material is being sliced.

In the drawings, the numeral 1 designates the supporting base or frame of a slicing machine having a reciprocating table 2 slidably mounted on guides 24 carried by the base 1. A transversely sliding meat support 3 is carried by the reciprocating table 2 and is provided with a feed screw 8 having a ratchet 9 connected thereto arranged to be operated by a pawl 10 in a well-known manner. The slicing machine has the usual main drive shaft 5 and slicing knife 4 mounted on a spindle 6. A clamp 7 is provided for securing the meat or other material 25 in place on the support 3. The table 2 is provided with an arm 11 which carries a nut for engaging the threads on the screw shaft 8. The ratchet 10 is carried on a bell crank journaled on the end of the shaft 8, the bell crank having a contact member 13 for engaging a stop 14 secured to the base 1. When the reciprocating table reaches the position shown in Fig. 1 the contact member 13 will rotate the bell crank and pawl 10 in a counter-clockwise direction, as viewed in Fig. 1, to rotate the screw shaft 8 and feed the meat support 3 toward the cutting plane of the slicing knife. A spring, not shown, is provided for returning the bell crank and pawl 10 in the opposite direction upon reverse movement of the reciprocating table. The amount of rotation by the ratchet wheel 9 is controlled by a cam or shroud 12 journaled on the shaft 8 and connected by a link 15 to an adjustable segment 16. The segment 16 is pivotally mounted on the reciprocating table 2 and is provided with a spring detent 40 yieldingly mounted on the table 2 for engaging depressions in the segment to hold it in its various positions of adjustment. The segmental shape of the member 16 is to permit the detent 40 to engage the depressions therein for different angular positions of the segment. The segment 16 is fixed to a pinion 17 and hand wheel 34 by means of which the pinion and segment may be turned upon their supporting axis. A rack 18 meshes with the pinion 17 and is arranged in alinement with a lever 19 so that the end of the rack will strike the lever 19 when the table 2 approaches the end of its travel.

The lever 19 is pivoted on a screw shaft 20, the screw shaft being journaled in bearings on the frame 1. A ratchet wheel 21 is secured to the screw shaft 20 and a pawl 22 is carried by the lever 19 in position to engage the teeth of the ratchet wheel 21. When the lever 19 is operated by the rack 18 the screw shaft 20 will be rotated in a counter-clockwise direction, as viewed in Fig. 1. When the table 2 moves away from the end of its stroke toward the slicing knife 4 the lever 19 and pawl 22 will be returned to their normal position by a spring, not shown. A segmental nut 26 engages the threads of the screw 20 so that rotation of the screw by the pawl 22 moves the nut to the left, as viewed in Fig. 2. The nut 26 is connected by a link 28 to an arm 29 fixed to a shaft 30 journaled on the front edge of the base 1. Parallel motion mechanism 32 is connected to the shaft 30 and supports the slice receiving plate 33. The lower arm of the parallel motion mechanism 32 is rigid with the arm 29. It will be apparent from Fig. 2 that movement of the nut 26 to the left will lower the slice receiver 33. Rotation of the hand wheel 34 will shift the rack 18 and the link 15 to vary the operation of the feed screws 8 and 20. Since the adjustment of both feed screws is made by the same adjustment hand wheel a change in the thickness of slices as controlled by the feed screw 8 will be accompanied by a corresponding change in the rate of feeding movement of the slice receiving table 33 so that the slice receiver will be fed downwardly by amounts commensurate with the thickness of the slices cut. By releasing the engaging nuts for the feed table or the slice receiver from their respective feed screws, either the slice receiver or the feed table may be adjusted to any desired initial position independently of the other, and after the nuts have been re-engaged the feeding mechanism will operate to feed the two members by commensurate amounts.

Figure 2:
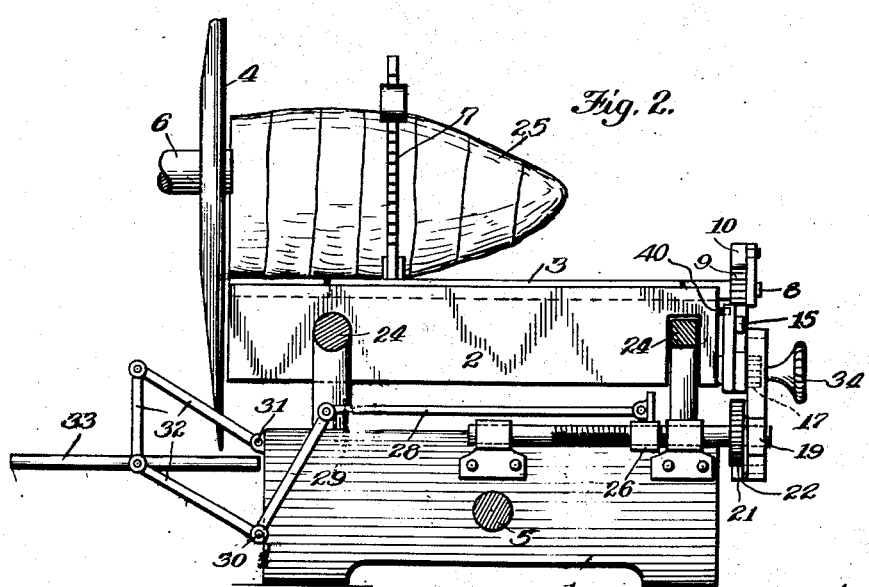
Fig. 2 is a side elevation of the machine shown in Fig. 1.
Figure 3:
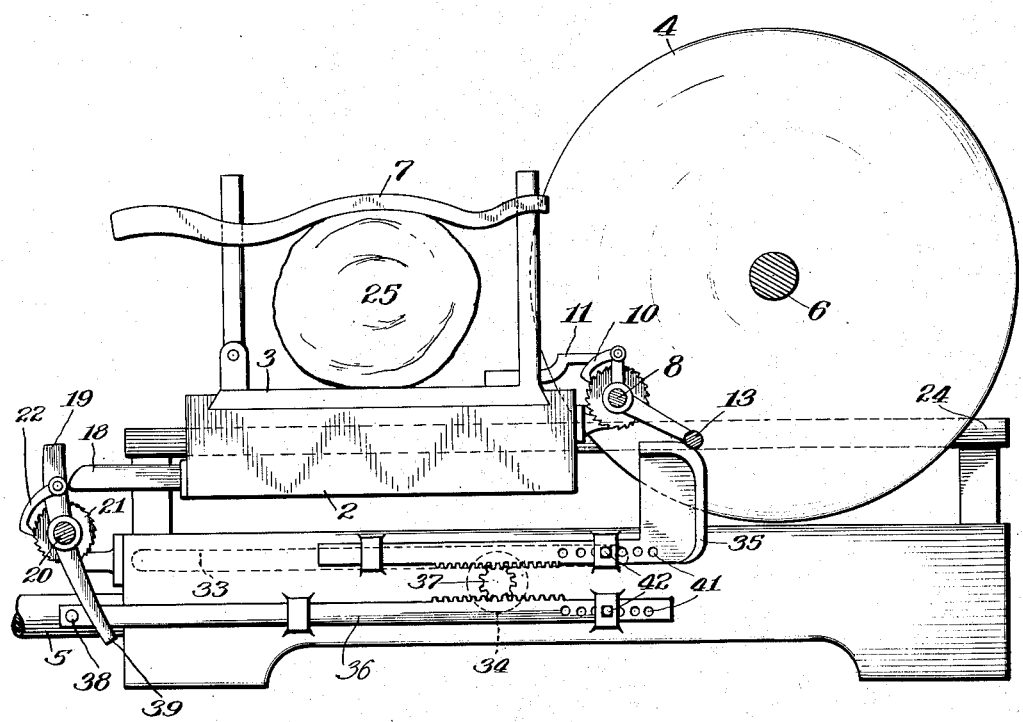
Fig. 3 is a view similar to Fig. 1 showing a modified form of the invention.

In the modification shown in Fig. 3, the corresponding parts have been numbered with the same reference characters as in Figs. 1 and 2. In Fig. 3, however, the adjustment members are mounted on the stationary base 1 and not on the reciprocating table 2. In this form the adjustment mechanism comprises a pinion 37 operated by a hand wheel 34 and meshing with racks 35 and 36. The rack 35 carries the stop for operating the contact member 13 to regulate the amount of movement of the feed screw 8 while the rack 36 carries a stop pin 38 for limiting the return movement of a tail-piece 39 secured to the lever 19. It will be apparent that rotation of the hand wheel 34 will simultaneously adjust the two ratchet devices to regulate the feeding movement of the screw shafts 8 and 20 so that they will be commensurate with each other. Since the adjustment handle 34 in Fig. 3 is mounted on a stationary part the adjustment of the thickness of slices may be conveniently regulated with this form of mechanism while the slicing machine is operating.

I claim:—

1. The combination with a slicing machine, of adjustable means for regulating the thickness of slices formed by said machine, a slice receiver, feeding mechanism for moving said slice receiver, adjustable means for regulating the amount of movement of said feeding mechanism, and means connecting said slice thickness regulating means and said regulating means for the feeding mechanism of said slice receiver to cause the movement of said slice receiver to be commensurate with the thickness of slices.

2. The combination with a slicing machine, of means for regulating the thickness of slices formed by said machine, a receiver for slices formed by said machine, means for adjusting the position of said receiver, and common means for adjusting said slice regulator and said position adjusting means for said slice receiver to cause said slice receiver to be moved amounts commensurate with the thickness of slices formed by said machine.

3. The combination with a slicing machine having a support for material to be sliced, of means for feeding said support to bring the material thereon into position to be sliced, said feeding means being adjustable to regulate the thickness of slices, a slice receiver, means for moving said slice receiver to accommodate additional slices deposited thereon, said receiver moving means being adjustable to impart different amounts of movement to said receiver, and common mechanism for adjusting the feeding means for said material support and the moving means for said slice support to cause the movement of said slice support to be commensurate with the thickness of slices.

4. In a slicing machine, a support for material to be sliced, means for periodically feeding said support to bring portions of said material into position to be sliced, said feeding means being adjustable to vary the thickness of slices, a slice receiver, adjustable means for shifting said receiver to accommodate additional slices as they are formed, and connection between the adjustable means for feeding said material support and the adjustable means for shifting said slice receiver to effect corresponding adjustments of said feeding means and said shifting means so that the movement of said slice receiver will be commensurate with the thickness of slices.

5. The combination with a slicing machine, having a reciprocating table, a rotary slicing knife and a material support mounted on said reciprocating table, of a feed screw for moving said material support toward the cutting plane of said slicing knife, ratchet mechanism operable at each reciprocation of said table for rotating said feed screw, adjustable means for regulating the operation of said ratchet mechanism, a slice receiving table, a feed screw for shifting said table to accommodate additional slices as they are formed, ratchet mechanism for rotating said last-named feed screw, adjustable means for controlling said last-named ratchet mechanism, and a common device for operating the adjustable means for said ratchet mechanisms.

6. A slicing machine comprising a base, a table mounted to reciprocate on said base, a rotary slicing knife, a material support movable transversely of said reciprocating table, a feed screw for moving said material support, ratchet mechanism for operating said feed screw, a slice receiver, a feed screw for shifting said slice receiver to accommodate additional slices, ratchet mechanism for operating said last-named feed screw, abutment members, one on said reciprocating table and one on said base for operating said ratchet mechanisms respectively, means for adjusting said abutment members, and a connection between said adjusting means to insure commensurate adjustment of said ratchet mechanisms.

In testimony whereof I have signed my name to this specification on this twenty-first day of October A. D. 1926.

WILHELMUS ADRIANUS van BERKEL.